US011105665B2

(12) United States Patent
Arai et al.

(10) Patent No.: US 11,105,665 B2
(45) Date of Patent: Aug. 31, 2021

(54) ELECTROMAGNETIC FLOWMETER AND CONTROL METHOD FOR DIAGNOSING PRESENCE OR ABSENCE OF AN ATTACHED CONDUCTIVE SUBSTANCE TO THE ELECTRODE SURFACE

(71) Applicant: Yokogawa Electric Corporation, Tokyo (JP)

(72) Inventors: Takashi Arai, Tokyo (JP); Yusaku Yoshida, Tokyo (JP); Shuichi Sato, Tokyo (JP); Ikuhiko Ishikawa, Tokyo (JP)

(73) Assignee: Yokogawa Electric Corporation, Musashino (JP)

( * ) Notice: Subject to any disclaimer, the term of this patent is extended or adjusted under 35 U.S.C. 154(b) by 156 days.

(21) Appl. No.: 16/504,399

(22) Filed: Jul. 8, 2019

(65) Prior Publication Data
US 2020/0018627 A1    Jan. 16, 2020

(30) Foreign Application Priority Data

Jul. 10, 2018    (JP) .............................. JP2018-130596

(51) Int. Cl.
*G01F 1/60*    (2006.01)
*G01F 1/58*    (2006.01)
(52) U.S. Cl.
CPC ................ *G01F 1/588* (2013.01); *G01F 1/60* (2013.01)
(58) Field of Classification Search
None
See application file for complete search history.

(56) References Cited

U.S. PATENT DOCUMENTS

| 6,369,579 | B1 | 4/2002 | Riegel |
| 2003/0051557 | A1 | 3/2003 | Ishikawa et al. |
| 2008/0262796 | A1 | 10/2008 | Rufer et al. |
| 2012/0003941 | A1 | 1/2012 | Xiao et al. |
| 2012/0036941 | A1 | 2/2012 | Drahm et al. |
| 2017/0184440 | A1 | 6/2017 | Shimura |

FOREIGN PATENT DOCUMENTS

| JP | 2003-097986 A | 4/2003 |
| JP | 2006-234840 A | 9/2006 |
| JP | 2012-078280 A | 4/2012 |

OTHER PUBLICATIONS

Osamu Yoshikawa et al., "New ADMAG AXF Series Magnetic Flowmeters", Yokogawa Technical Report, 2004, pp. 19-24, vol. 48, No. 1.

*Primary Examiner* — Harshad R Patel
(74) *Attorney, Agent, or Firm* — Sughrue Mion, PLLC

(57) ABSTRACT

An electromagnetic flowmeter measures a flow rate of a liquid of a measurement target that flows in a magnetic field formed within a measurement pipe. The electromagnetic flowmeter includes at least one pair of detection electrodes configured to detect an electromotive force generated due to a flow of the liquid, and configured to output a flow rate signal of a magnitude of the detected electromotive force, a measurement circuit configured to supply an alternating current between the detection electrodes and an earth electrode, and a control calculator configured to control a frequency of the alternating current to be 1 kHz or more, and configured to calculate a conductivity of the liquid whose conductivity is 1 mS/cm or more based on the flow rate signal output when the alternating current flows between the detection electrodes and the earth electrode.

14 Claims, 5 Drawing Sheets

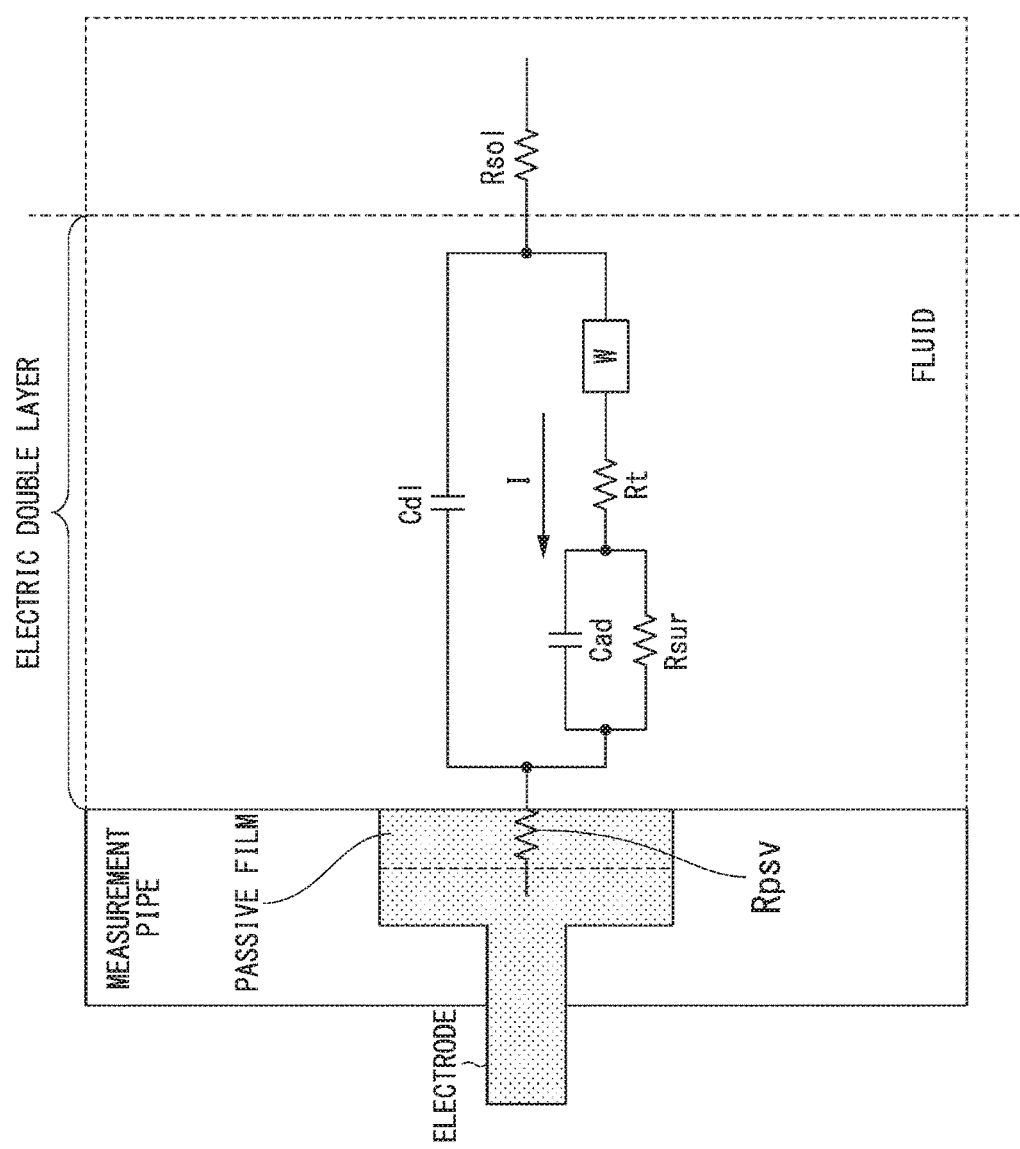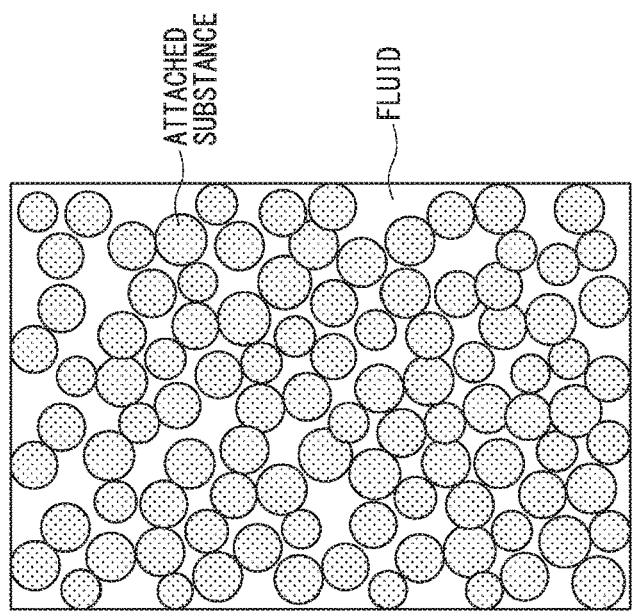
FIG. 3A
FIG. 3B

ELECTROMAGNETIC FLOWMETER AND CONTROL METHOD FOR DIAGNOSING PRESENCE OR ABSENCE OF AN ATTACHED CONDUCTIVE SUBSTANCE TO THE ELECTRODE SURFACE

BACKGROUND

Technical Fields

The present invention relates to an electromagnetic flowmeter and a control method of the electromagnetic flowmeter.

Priority is claimed on Japanese Patent Application No. 2018-130596, filed on Jul. 10, 2018, the contents of which are incorporated herein by reference.

Related Art

Conventionally, an electromagnetic flowmeter for measuring a flow rate of a conductive fluid that flows inside a measurement pipe using electromagnetic induction has been put to practical use. The electromagnetic flowmeter measures a flow rate of a conductive liquid using an excitation coil disposed outside the measurement pipe to form a magnetic field and a pair of electrodes mounted inside the measurement pipe. More specifically, in the electromagnetic flowmeter, the excitation coil forms the magnetic field in a direction perpendicular to a direction in which the conductive fluid flows and a generated electromotive force (voltage) when the fluid flows inside the measurement pipe, i.e., inside the magnetic field, is measured by a pair of electrodes. In the electromagnetic flowmeter, the flow rate of the fluid is measured (calculated) on the basis of a measured magnitude (voltage value) of the electromotive force using the fact that the magnitude (the voltage value) of the measured electromotive force is proportional to a speed (a fluid speed) of the fluid that flows inside the measurement pipe and information representing the measured flow rate of the fluid is output.

Also, conventional electromagnetic flowmeters have a function of measuring the conductivity of a conductive liquid in addition to the fluid flow rate. The measurement of the conductivity of the liquid in the electromagnetic flowmeter is performed using an alternating current (AC) signal synchronized with a frequency that causes the excitation coil to form a magnetic field when the fluid flow rate is measured. More specifically, the measurement of the conductivity of the liquid in the electromagnetic flowmeter is performed by supplying a current of a predetermined frequency from the electrode to the earth ring at a multiple of the frequency that causes the excitation coil to form a magnetic field and measuring the impedance between the electrode and the earth ring. At this time, a frequency that does not affect the measurement of the fluid flow rate is selected as the frequency of the current that flows from the electrode to the earth ring. Also, the earth ring is a reference electrode for providing the same potential (ground potential) as that of the measurement pipe.

Incidentally, it is considered that a substance that causes contamination is attached to the electrode of the electromagnetic flowmeter. Also, in the electromagnetic flowmeter, it is also considered that the electrode is corroded according to an attached substance or a type of fluid that flows inside the measurement pipe. In this case, in the electromagnetic flowmeter, an error may occur in the fluid flow rate to be measured. Furthermore, it is also considered that the substance attached to the electrodes of the electromagnetic flowmeter clogs (blocks) the measurement pipe when an amount thereof is large.

Thus, conventionally, various technologies for diagnosing the attachment of a substance to an electrode and the corrosion of an electrode in an electromagnetic flowmeter have been proposed.

For example, Yoshikawa Osamu, Shukutani Norihiro, Tanaka Toshiyuki, Tanabe Seiji, Arai Takashi, and Ota Hironobu, "New ADMAG AXF Series Magnetic Flowmeters", Yokogawa Electric Corporation, Yokogawa Technical Report, Vol. 48, no. 1, pp. 19-24 discloses the technology of an electromagnetic flowmeter for diagnosing the attachment of an insulator to an electrode. In the technology disclosed in "New ADMAG AXF Series Magnetic Flowmeters", an attachment level of the insulator to the electrode is determined by supplying an extremely small rectangular current from the electrode to the earth ring and measuring a resistance value between the electrode and the earth ring according to the principle of Ohm's law. For example, Japanese Unexamined Patent Application Publication No. 2006-234840 and Japanese Unexamined Patent Application Publication No. 2003-097986 disclose the technology of the electromagnetic flowmeter using the technology for diagnosing the attachment of the insulator to the electrode as disclosed in "New ADMAG AXF Series Magnetic Flowmeters".

Also, the electromagnetic flowmeters disclosed in Japanese Unexamined Patent Application Publication No. 2006-234840 and Japanese Unexamined Patent Application Publication No. 2003-097986 use a configuration for determining the insulator attached to the electrode also for the measurement of the conductivity of a liquid. That is, in the electromagnetic flowmeters disclosed in Japanese Unexamined Patent Application Publication No. 2006-234840 and Japanese Unexamined Patent Application Publication No. 2003-097986, a current that flows from the electrode to the earth ring for determining the insulator attached to the electrode and a current that flows from the electrode to the earth ring for measuring the conductivity of the liquid flow from the same circuit.

Also, for example, Japanese Unexamined Patent Application Publication No. 2012-078280 discloses technology of an electromagnetic flowmeter for enabling a degree of corrosion in the electrode to be ascertained by applying the technology for diagnosing the attachment of the insulator to the electrode as disclosed in "New ADMAG AXF Series Magnetic Flowmeters". In the technology disclosed in Japanese Unexamined Patent Application Publication No. 2012-078280, the impedance between the electrode and the earth ring is schematically represented (modeled) by a simple equivalent circuit in which a resistor and a capacitor are combined. In the technology disclosed in Japanese Unexamined Patent Application Publication No. 2012-078280, the impedance between the electrode and the earth ring is measured while the frequency of an extremely small rectangular current that flows from the electrode to the earth ring is being changed and the measured impedance is plotted in accordance with a Cole-Cole arc rule to determine a state of corrosion of the electrode. That is, in the technology disclosed in Japanese Unexamined Patent Application Publication No. 2012-078280, the state of corrosion of the electrode is determined on the basis of a result of measuring impedance between the electrode and the earth ring using the fact that the Cole-Cole arc shape changes according to the state of corrosion of the electrode.

Incidentally, there are various types of substances as substances attached to the electrodes in the electromagnetic flowmeter. However, the substance attached to the electrode determined in the technologies of the electromagnetic flowmeters disclosed in "New ADMAG AXF Series Magnetic Flowmeters", Japanese Unexamined Patent Application Publication No. 2006-234840, and Japanese Unexamined Patent Application Publication No. 2003-097986 is an insulating material (an insulator). Thus, when the substance attached to the electrode in the electromagnetic flowmeter is a conductive substance (for example, silica, calcium, or the like), the technologies of the electromagnetic flowmeters disclosed in "New ADMAG AXF Series Magnetic Flowmeters", Japanese Unexamined Patent Application Publication No. 2006-234840, and Japanese Unexamined Patent Application Publication No. 2003-097986 cannot be used.

Also, in the technologies of the electromagnetic flowmeters disclosed in Japanese Unexamined Patent Application Publication No. 2006-234840 and Japanese Unexamined Patent Application Publication No. 2003-097986, the determination of the insulator attached to the electrode and the measurement of the conductivity of the liquid are performed in the same circuit. Therefore, in the technologies of the electromagnetic flowmeters disclosed in Japanese Unexamined Patent Application Publication No. 2006-234840 and Japanese Unexamined Patent Application Publication No. 2003-097986, the frequency of the current that flows from the electrode to the earth ring for measuring the conductivity of the liquid depends upon the frequency of the current that flows from the electrode to the earth ring for determining the insulator attached to the electrode. Thus, in the technologies of the electromagnetic flowmeters disclosed in Japanese Unexamined Patent Application Publication No. 2006-234840 and Japanese Unexamined Patent Application Publication No. 2003-097986, when the conductivity of the liquid to be measured reaches certain conductivity or more, it is affected by the determination of the insulator attached to the electrode. Therefore, in the electromagnetic flowmeters disclosed in Japanese Unexamined Patent Application Publication No. 2006-234840 and Japanese Unexamined Patent Application Publication No. 2003-097986, a case in which the substance attached to the electrode is a conductive substance is included and a range of the conductivity of the liquid to be measured is also limited.

Also, the corrosion to be ascertained in the technology of the electromagnetic flowmeter disclosed in Japanese Unexamined Patent Application Publication No. 2012-078280 is the corrosion of an insulating substance (an insulator) attached to the electrode. Because the equivalent circuit of the impedance schematically represented (modeled) in the technology of the electromagnetic flowmeter disclosed in Japanese Unexamined Patent Application Publication No. 2012-078280 is simple, it cannot be said that the state of an interface of the electrode in the measurement pipe and the resistance of the fluid are correctly represented. Thus, in the technology of the electromagnetic flowmeter disclosed in Japanese Unexamined Patent Application Publication No. 2012-078280, it is difficult to measure a fluid flow rate with a small error from the measured impedance when a case in which the substance attached to the electrode is a conductive substance is included.

From these facts, even if the technologies of the electromagnetic flowmeters disclosed in "New ADMAG AXF Series Magnetic Flowmeters", Japanese Unexamined Patent Application Publication No. 2006-234840, Japanese Unexamined Patent Application Publication No. 2003-097986, and Japanese Unexamined Patent Application Publication No. 2012-078280 are used, it may be difficult to perform the measurement of the flow rate of the fluid or the conductivity of the liquid accurately (at a small error) in a state in which a case in which the substance attached to the electrode is a conductive substance is included.

SUMMARY

According to the present invention for solving the above-described problems, there is provided an electromagnetic flowmeter for measuring a flow rate of a liquid of a measurement target that flows in a magnetic field formed within a measurement pipe, the electromagnetic flowmeter may include: at least one pair of detection electrodes configured to detect an electromotive force generated due to a flow of the liquid, and configured to output a flow rate signal of a magnitude of the detected electromotive force; a measurement circuit configured to supply an alternating current between the detection electrodes and an earth electrode; and a control calculator configured to control a frequency of the alternating current to be 1 kHz or more, and configured to calculate a conductivity of the liquid whose conductivity is 1 mS/cm or more based on the flow rate signal output when the alternating current flows between the detection electrodes and the earth electrode.

Further features and aspects of the present disclosure will become apparent from the following detailed description of exemplary embodiments with reference to the attached drawings.

BRIEF DESCRIPTION OF THE DRAWINGS

FIG. 3A is a diagram showing an equivalent circuit in the field of electrochemistry referred to in the electromagnetic flowmeter according to the embodiment of the present invention.

FIG. 3B is a diagram showing the state of a substance attached to an electrode.

DETAILED DESCRIPTION OF THE EMBODIMENTS

The embodiments of the present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

An aspect of the present invention is to provide an electromagnetic flowmeter and a control method of the electromagnetic flowmeter capable of diagnosing the presence or absence of an attached substance even when a conductive substance is attached to an electrode and further measuring the conductivity of a liquid.

Figure 1:
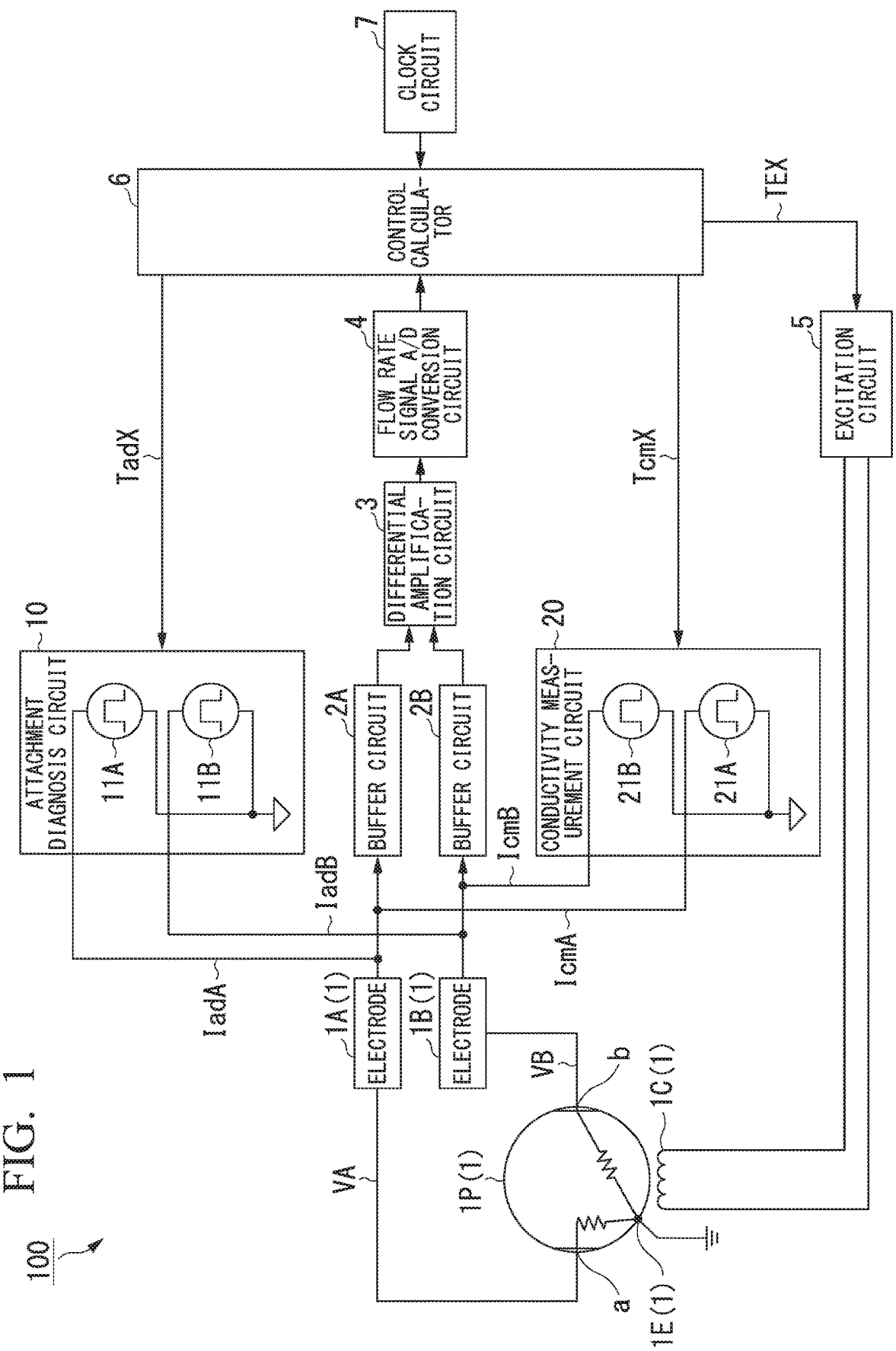
FIG. 1 is a block diagram showing a schematic configuration of an electromagnetic flowmeter according to an embodiment of the present invention.

Hereinafter, embodiments of the present invention will be described with reference to the drawings. FIG. 1 is a block diagram showing a schematic configuration of an electromagnetic flowmeter according to an embodiment of the present invention. An electromagnetic flowmeter 100 includes a sensor 1, a buffer circuit 2A, a buffer circuit 2B, a differential amplification circuit 3, a flow rate signal A/D conversion circuit 4, an excitation circuit 5, a control calculator 6, a clock circuit 7, an attachment diagnosis circuit 10, and a conductivity measurement circuit 20. Also, the sensor 1 includes a pair of detection electrodes (a detection electrode 1A and a detection electrode 1B), an excitation coil 1C, an earth ring 1E, and a measurement pipe 1P.

The electromagnetic flowmeter 100 is a device for measuring a flow rate of a conductive liquid on the basis of a speed (a fluid speed) of a conductive liquid that is a fluid of a measurement target that flows inside the measurement pipe 1P. For example, the electromagnetic flowmeter 100 is used as a field device that is installed in a facility such as a pipe disposed within a plant. The plant includes a plant that manages and controls a wellhead such as a gas field or an oil field and its surroundings, a plant that manages and controls power generation such as hydro, thermal and nuclear power generation, a plant that manages and controls environmental power generation such as solar or wind power generation, and a plant that manages and controls water and sewage, a dam, or the like, in addition to an industrial plant that performs petroleum refining and production of chemical products. In this case, the electromagnetic flowmeter 100 measures, for example, a fluid speed of a liquid product or a semi-finished product such as industrial water or medicine, at a position installed in a pipe disposed within the plant and measures a flow rate on the basis of the measured fluid speed. In the following description, an example in which the electromagnetic flowmeter 100 is installed in a pipe disposed within a plant and measures a flow rate of a conductive liquid by measuring a fluid speed of the conductive liquid that is a fluid of a measurement target that flows inside the measurement pipe 1P will be described.

The electromagnetic flowmeter 100 calculates a fluid speed of the liquid that flows inside the measurement pipe 1P on the basis of a voltage signal (hereinafter referred to as a "flow rate signal") measured by the sensor 1, and outputs a measurement signal representing the liquid flow rate calculated from the fluid speed. Also, the electromagnetic flowmeter 100 has a function of diagnosing the attachment of a conductive substance to the detection electrode 1A or the detection electrode 1B and a function of measuring the conductivity of a conductive liquid that is a fluid of a measurement target. The electromagnetic flowmeter 100 performs the diagnosis of the attachment of the conductive substance to the detection electrode 1A or the detection electrode 1B or the measurement of the conductivity of the liquid that flows inside the measurement pipe 1P on the basis of a flow rate signal measured by the sensor 1 and outputs a diagnosis result as a measurement signal.

Also, in the electromagnetic flowmeter 100, the excitation coil 1C constituting the sensor 1 is disposed outside the measurement pipe 1P and each of the detection electrode 1A and the detection electrode 1B that are a pair of detection electrodes constituting the sensor 1 is disposed at a position opposite to a surface with which the liquid is in contact inside the measurement pipe 1P (a position a or a position b shown in FIG. 1). However, in FIG. 1, for ease of description, each of the detection electrode 1A disposed at the position a and the detection electrode 1B disposed at the position b is extracted and shown at a position adjacent to the corresponding buffer circuit 2A or 2B. Also, in the electromagnetic flowmeter 100, the earth ring 1E constituting the sensor 1 is disposed at a position of a ground level (ground potential) of the measurement pipe 1P. The earth ring 1E is an earth electrode (a reference electrode) for providing the same potential (ground potential) as that of the measurement pipe 1P. Also, it is desirable that the earth ring 1E be disposed at a position where a distance between the detection electrode 1A and the earth ring 1E is equal to a distance between the detection electrode 1B and the earth ring 1E.

The sensor 1 forms a magnetic field relative to the measurement pipe 1P using the excitation coil 1C and detects an electromotive force (a voltage) generated due to the resistance (fluid resistance) of the liquid that flows inside the magnetic field formed by the excitation coil 1C, i.e., the liquid that flows inside the measurement pipe 1P, using each of the detection electrode 1A and the detection electrode 1B. The detection electrode 1A outputs a flow rate signal VA having a magnitude (a voltage value) of the detected electromotive force to the corresponding buffer circuit 2A. Also, the detection electrode 1B outputs a flow rate signal VB having a magnitude (a voltage value) of the detected electromotive force to the corresponding buffer circuit 2B.

The excitation circuit 5 is an excitation circuit for outputting an alternating current (AC) excitation current required to form the magnetic field relative to the measurement pipe 1P to the excitation coil 1C constituting the sensor 1. The excitation circuit 5 outputs an excitation current of a frequency of an excitation current timing signal TEX output from the control calculator 6 to the excitation coil 1C. Thereby, a magnetic field according to the frequency of the excitation current timing signal TEX is formed around the measurement pipe 1P by the excitation coil 1C. A flow rate signal (the flow rate signal VA and the flow rate signal VB) having the magnitude (the voltage value) of the electromotive force generated due to the liquid that flows inside the magnetic field formed by the excitation coil 1C in accordance with the excitation current output by the excitation circuit 5 is output from each of the detection electrode 1A and the detection electrode 1B to either the buffer circuit 2A or the buffer circuit 2B corresponding thereto.

The attachment diagnosis circuit 10 is a synchronous rectification circuit that outputs a rectangular AC signal (a rectangular AC (hereinafter referred to as a "rectangular current")) of a predetermined signal level (a current value) between the detection electrode 1A and the detection electrode 1B and the earth ring 1E, i.e., a pipe (a ground level), when the attachment of a conductive substance to a detection electrode is diagnosed in the electromagnetic flowmeter 100. The attachment diagnosis circuit 10 supplies a rectangular current IadA of a predetermined current value between the detection electrode 1A and the earth ring 1E at a frequency of an attachment diagnosis timing signal TadX output from the control calculator 6. Also, the attachment diagnosis circuit 10 supplies a rectangular current IadB of a predetermined current value between the detection electrode 1B and the earth ring 1E at the frequency of the attachment diagnosis timing signal TadX output from the control calculator 6.

The attachment diagnosis circuit 10 includes a constant current source 11A and a constant current source 11B. Each of the constant current source 11A and the constant current source 11B is a constant current source that outputs a rectangular current of a current value according to control from the control calculator 6. The constant current source 11A is a constant current source that supplies the rectangular current IadA to the detection electrode 1A and to the earth ring 1E via voltage output line VA. Also, the constant current source 11B is a constant current source that supplies the rectangular current IadB to the detection electrode 1B and to the earth ring 1E via voltage output line VB. The rectangular current IadA supplied to the detection electrode 1A by the constant current source 11A and the rectangular current IadB supplied to the detection electrode 1B by the constant current source 11B are ACs having opposite polarities (opposite phases, i.e., phases shifted by 180 degrees with respect to each other) at the same frequency.

The conductivity measurement circuit 20 is a synchronous rectification circuit that outputs a rectangular current of a predetermined signal level (a current value) between the detection electrode 1A and the detection electrode 1B and the earth ring 1E, i.e., a pipe (a ground level), when the conductivity of the liquid is measured in the electromagnetic flowmeter 100. The conductivity measurement circuit 20 supplies a rectangular current IcmA of a predetermined current value between the detection electrode 1A and the earth ring 1E at a frequency of a conductivity measurement timing signal TcmX output from the control calculator 6. Also, the conductivity measurement circuit 20 supplies a rectangular current IcmB of a predetermined current value between the detection electrode 1B and the earth ring 1E at the frequency of the conductivity measurement timing signal TcmX output from the control calculator 6.

The conductivity measurement circuit 20 includes a constant current source 21A and a constant current source 21B. Each of the constant current source 21A and the constant current source 21B is a constant current source that outputs a rectangular current of a current value according to control from the control calculator 6. The constant current source 21A is a constant current source that supplies the rectangular current IcmA between the detection electrode 1A and the earth ring 1E. Also, the constant current source 21B is a constant current source that supplies the rectangular current IcmB between the detection electrode 1B and the earth ring 1E. Also, similar to the rectangular current IadA supplied by the constant current source 11A provided in the attachment diagnosis circuit 10 and the rectangular current IadB supplied by the constant current source 11B, the rectangular current IcmA supplied between the detection electrode 1A and the earth ring 1E by the constant current source 21A and the rectangular current IcmB supplied between the detection electrode 1B and the earth ring 1E by the constant current source 21B are ACs having opposite phases at the same frequency.

Each of the buffer circuit 2A and the buffer circuit 2B is a buffer circuit for delivering the flow rate signal (the flow rate signal VA or the flow rate signal VB) output to the corresponding detection electrode 1A or 1B to the differential amplification circuit 3. Each of the buffer circuit 2A and the buffer circuit 2B converts the impedance of the flow rate signal output from the corresponding detection electrode 1A or 1B and outputs the flow rate signal after the impedance conversion to the differential amplification circuit 3.

The differential amplification circuit 3 takes a difference between the flow rate signals after the impedance conversion output from the buffer circuit 2A and the buffer circuit 2B, further amplifies a signal level of a flow rate signal obtained by taking the difference, and outputs the flow rate signal to the flow rate signal A/D conversion circuit 4. In the following description, the flow rate signal obtained by taking the difference output to the flow rate signal A/D conversion circuit 4 by the differential amplification circuit 3 is referred to as a "difference flow rate signal". The differential amplification circuit 3 takes the difference between the flow rate signals output from the buffer circuit 2A and the buffer circuit 2B and therefore, for example, a difference flow rate signal from which noise of an in-phase component such as commercial noise, included in each flow rate signal has been removed is output to the flow rate signal A/D conversion circuit 4 in the electromagnetic flowmeter 100.

The flow rate signal A/D conversion circuit 4 performs analog-to-digital conversion on the difference flow rate signal (an analog signal) output from the differential amplification circuit 3 and generates a digital signal (hereinafter referred to as a "difference digital flow rate signal") having a digital value according to the magnitudes of the signal levels of the flow rate signals (the flow rate signal VA and the flow rate signal VB) detected by the sensor 1. The flow rate signal A/D conversion circuit 4 outputs the generated difference digital flow rate signal to the control calculator 6. The difference digital flow rate signal output by the flow rate signal A/D conversion circuit 4 may be used for a calculation process (hereinafter referred to as a "flow rate calculation process") of calculating a flow rate of the liquid that flows inside the measurement pipe 1P in a normal measurement operation (hereinafter referred to as a "flow rate measurement operation") in which the electromagnetic flowmeter 100 measures a fluid flow rate. Also, the difference digital flow rate signal output by the flow rate signal A/D conversion circuit 4 may be used for a calculation process (hereinafter referred to as an "electrode attachment calculation process") of diagnosing the attachment of the conductive substance to the detection electrode from electrical characteristics of the substance attached to the detection electrode in a diagnosis operation (hereinafter referred to as an "attachment diagnosis operation") in which the electromagnetic flowmeter 100 diagnoses the attachment of the conductive substance to the detection electrode. Also, in the electromagnetic flowmeter 100, it is possible to perform the attachment diagnosis operation on either one of the detection electrode 1A and the detection electrode 1B and diagnose the attachment of the conductive substance for each detection electrode using the difference digital flow rate signal corresponding to the flow rate signal (the flow rate signal VA or the flow rate signal VB) output to either one of the detection electrode 1A and the detection electrode 1B in the electrode attachment calculation process. Also, the difference digital flow rate signal output by the flow rate signal A/D conversion circuit 4 is used for a calculation process (hereinafter referred to as a "conductivity calculation process") for calculating the conductivity of the liquid that flows inside the measurement pipe 1P in a measurement operation (hereinafter referred to as a "conductivity measurement operation") in which the electromagnetic flowmeter 100 measures the conductivity of the liquid. Also, in the conductivity calculation process in the electromagnetic flowmeter 100, only the difference digital flow rate signal corresponding to the flow rate signal (the flow rate signal VA or the flow rate signal VB) output to either one of the detection electrode 1A and the detection electrode 1B may be used.

The clock circuit 7 oscillates a clock and supplies the control calculator 6 with a signal of the oscillated clock as a reference clock signal (a system clock signal) by which the control calculator 6 is operated, i.e., the electromagnetic flowmeter 100 is operated. Clock signals supplied to the control calculator 6 by the clock circuit 7 may be a plurality of clock signals such as a signal of an original oscillation clock that has been oscillated and a signal of a frequency-divided clock obtained by dividing the original oscillation clock.

The control calculator 6 operates on the basis of the clock signal output from the clock circuit 7 and controls each component provided in the electromagnetic flowmeter 100. The control calculator 6 includes, for example, a central processing unit (CPU) and the like, and controls all components provided in the electromagnetic flowmeter 100 in accordance with an application program for implementing the function of the electromagnetic flowmeter 100. The application program to be executed by the control calculator 6 may be stored in a storage (not shown) including various memories such as, for example, a read only memory (ROM), a random access memory (RAM), and a flash memory. In this case, the control calculator 6 controls all the components provided in the electromagnetic flowmeter 100 by reading and executing an application program stored in the storage (not shown).

The electromagnetic flowmeter 100 can perform the flow rate measurement operation, the attachment diagnosis operation, and the conductivity measurement operation. The control calculator 6 generates a timing signal of each of frequencies required for the excitation circuit 5, the attachment diagnosis circuit 10, and the conductivity measurement circuit 20 to operate in accordance with an operation performed by the electromagnetic flowmeter 100. More specifically, the control calculator 6 generates the excitation current timing signal TEX of a frequency (for example, a frequency of 300 Hz or less) required for the excitation circuit 5 to cause the excitation coil 1C to form a magnetic field for the measurement pipe 1P. Also, the frequency of the excitation current timing signal TEX generated by the control calculator 6 is similar to that of the conventional electromagnetic flowmeter. Also, the control calculator 6 generates the attachment diagnosis timing signal TadX of a frequency swept within a predetermined frequency range (for example, between 10 Hz and 2 MHz) required for the electromagnetic flowmeter 100 to perform the attachment diagnosis operation. The frequency of the attachment diagnosis timing signal TadX generated by the control calculator 6 when the electromagnetic flowmeter 100 performs the attachment diagnosis operation is not limited to sweeping between 10 Hz and 2 MHz. For example, the frequency may be sequentially switched to a plurality of predetermined frequencies between 10 Hz and 2 MHz. Also, the control calculator 6 generates the conductivity measurement timing signal TcmX of a predetermined high frequency (for example, a frequency of 1 kHz or more) required for the electromagnetic flowmeter 100 to perform the conductivity measurement operation. That is, the control calculator 6 sets the frequency of the conductivity measurement timing signal TcmX generated when the electromagnetic flowmeter 100 performs the conductivity measurement operation to be greater than or equal to the frequency of the attachment diagnosis timing signal TadX generated when the electromagnetic flowmeter 100 performs the attachment diagnosis operation. Also, for example, the conductivity measurement timing signal TcmX generated by the control calculator 6 when the electromagnetic flowmeter 100 performs the conductivity measurement operation may be used for sweeping a frequency between 1 kHz and 20 kHz or for performing sequential switching to a predetermined frequency between 1 kHz and 20 kHz.

Also, the timing signals of the excitation current timing signal TEX, the attachment diagnosis timing signal TadX, and the conductivity measurement timing signal TcmX generated by the control calculator 6 are not correlated with each other. The timing signals of the excitation current timing signal TEX, the attachment diagnosis timing signal TadX, and the conductivity measurement timing signal TcmX do not have to be synchronized with a clock signal (a system clock signal) input from the clock circuit 7. That is, the timing signals of the excitation current timing signal TEX, the attachment diagnosis timing signal TadX, and the conductivity measurement timing signal TcmX do not depend upon each other and furthermore do not depend upon the clock signal (the system clock signal) input from the clock circuit 7. However, the control calculator 6 may be configured to easily generate some or all timing signals of the excitation current timing signal TEX, the attachment diagnosis timing signal TadX, and the conductivity measurement timing signal TcmX by dividing the clock signal input from the clock circuit 7 by a predetermined division ratio.

Then, the control calculator 6 outputs the generated timing signals to the corresponding components. More specifically, the control calculator 6 outputs the excitation current timing signal TEX to the excitation circuit 5, outputs the attachment diagnosis timing signal TadX to the attachment diagnosis circuit 10, and outputs the conductivity measurement timing signal TcmX to the conductivity measurement circuit 20. At this time, the control calculator 6 switches whether or not to output the generated timing signals (the excitation current timing signal TEX, the attachment diagnosis timing signal TadX, and the conductivity measurement timing signal TcmX) to each of the excitation circuit 5, the attachment diagnosis circuit 10, and the conductivity measurement circuit 20 in accordance with which of the flow rate measurement operation, the attachment diagnosis operation, and the conductivity measurement operation is performed by the electromagnetic flowmeter 100. More specifically, when the electromagnetic flowmeter 100 performs the flow rate measurement operation, the control calculator 6 outputs the excitation current timing signal TEX to the excitation circuit 5 and does not output the corresponding timing signal to each of the attachment diagnosis circuit 10 and the conductivity measurement circuit 20. Also, when the electromagnetic flowmeter 100 performs the attachment diagnosis operation, the control calculator 6 outputs the attachment diagnosis timing signal TadX to the attachment diagnosis circuit 10 and does not output the corresponding timing signal to each of the excitation circuit 5 and the conductivity measurement circuit 20. Also, when the electromagnetic flowmeter 100 performs the conductivity measurement operation, the control calculator 6 outputs the conductivity measurement timing signal TcmX to the conductivity measurement circuit 20 and does not output the corresponding timing signal to each of the excitation circuit 5 and the attachment diagnosis circuit 10. That is, the control calculator 6 exclusively performs switching between the outputs of the generated timing signals when the electromagnetic flowmeter 100 performs the flow rate measurement operation, the attachment diagnosis operation, and the conductivity measurement operation.

Also, in the present invention, a length of each of the period in which the flow rate measurement operation is performed, the period in which the attachment diagnosis operation is performed, and the period in which the conductivity measurement operation is performed in the electromagnetic flowmeter 100 is not particularly specified. For example, the electromagnetic flowmeter 100 may sequentially perform the flow rate measurement operation, the attachment diagnosis operation, and the conductivity measurement operation for each predetermined periodic period. Also, for example, the electromagnetic flowmeter 100 may alternately perform the flow rate measurement operation and the attachment diagnosis operation or the conductivity measurement operation for each predetermined periodic period. At this time, the electromagnetic flowmeter 100 may alternately perform the attachment diagnosis operation and the conductivity measurement operation during a period in which the flow rate measurement operation is not performed. Also, for example, the electromagnetic flowmeter 100 may perform the attachment diagnosis operation and the conductivity measurement operation at a predetermined rate such as once or twice a day and may perform the flow rate measurement operation at other times. Therefore, when the electromagnetic flowmeter 100 performs different operations, the control calculator 6 may generate and output timing signals to be output to the excitation circuit 5, the attachment diagnosis circuit 10, and the conductivity measurement circuit 20.

Also, in the electromagnetic flowmeter 100, switching between the attachment diagnosis operation and the conductivity measurement operation is performed by the attachment diagnosis timing signal TadX output to the attachment diagnosis circuit 10 by the control calculator 6 and the conductivity measurement timing signal TcmX output to the conductivity measurement circuit 20. However, in the electromagnetic flowmeter 100, the attachment diagnosis operation and the conductivity measurement operation can be performed at the same time. More specifically, the control calculator 6 outputs the conductivity measurement timing signal TcmX having a frequency of 1 kHz or more (for example, 20 kHz) for performing the conductivity measurement operation to the conductivity measurement circuit 20 after the attachment diagnosis timing signal TadX whose frequency has been swept between 10 kHz and 2 MHz or sequentially switched to a predetermined frequency is output to the attachment diagnosis circuit 10 in order to perform the attachment diagnosis operation. Thereby, the control calculator 6 can perform the attachment diagnosis operation and the conductivity measurement operation at the same time in the electromagnetic flowmeter 100.

Also, the control calculator 6 is a calculation processor for performing a flow rate calculation process, an electrode attachment calculation process, and a conductivity calculation process predetermined in the electromagnetic flowmeter 100 on the difference digital flow rate signal output from the flow rate signal A/D conversion circuit 4. As a result of performing each calculation process, i.e., a result of diagnosing the flow rate of the liquid that flows inside the measurement pipe 1P or the attachment of the conductive substance to the detection electrode, the control calculator 6 outputs a digital signal representing the conductivity of the liquid that flows inside the measurement pipe 1P as a measurement signal to the outside of the electromagnetic flowmeter 100. Also, the control calculator 6 may use a storage (not shown) when the flow rate calculation process, the electrode attachment calculation process, and the conductivity calculation process are performed. That is, the control calculator 6 may execute each calculation process while temporarily storing (writing) data or the like during processing in the storage (not shown) or acquiring (reading) data stored in the storage (not shown) in each calculation process.

Also, the control calculator 6 may be configured to output the difference digital flow rate signal output from the flow rate signal A/D conversion circuit 4 as a measurement signal without performing each of the flow rate calculation process, the electrode attachment calculation process, and the conductivity calculation process. In this case, for example, it is possible to perform each of the flow rate calculation process, the electrode attachment calculation process, and the conductivity calculation process on the measurement signal output from the electromagnetic flowmeter 100 by a personal computer (PC) or the like outside the electromagnetic flowmeter 100.

Also, when the digital signal is externally output as a measurement signal, the control calculator 6 may convert a digital value represented by the digital signal into, for example, a digital value of a predetermined range, and then output the digital value. Also, the control calculator 6 may convert the measurement signal (the digital signal) to be externally output into, for example, a direct current (DC) analog signal in a range of 4 mA to 20 mA, and output the DC analog signal as an analog signal (a current signal). In this case, the control calculator 6 converts a digital value represented by the measurement signal (the digital signal) to be externally output into a DC analog signal represented by a signal level in the range of 4 mA to 20 mA according to digital-to-analog conversion and outputs the DC analog signal. Also, for example, the control calculator 6 may output the measurement signal of the DC analog signal to the outside of the electromagnetic flowmeter 100 such as a control device for controlling the operation of the facility in the plant according to communication through a communication network exclusively constructed within the plant. As a communication network established in the plant, for example, a communication network for transmitting and receiving data and the like between the electromagnetic flowmeter 100 and the control device according to various communication standards including an industrial wireless standard such as ISA100.11a, a wireless standard such as a sensor network system, a communication standard in which wireless and wired standards are mixed such as wireless/wired HART (registered trademark), a master/slave type communication standard such as MODBUS (registered trademark), and the like is conceived. Also, as the communication network constructed in the plant, for example, a communication network for exchanging data and the like between the electromagnetic flowmeter 100 and the control device according to various schemes including field bus standards such as a FOUNDATION (registered trademark) field bus, and a process field bus (PROFIBUS) (registered trademark) is conceived. Also, the communication network may be, for example, a communication network for performing transmission and reception between the electromagnetic flowmeter 100 and the control device according to a general wireless standard of WiFi (registered trademark). In this case, technology in which the control calculator 6 outputs (transmits) the digital signal as it is to the outside of the electromagnetic flowmeter 100 such as a control device without converting the digital signal to be output into a DC analog signal according to digital-to-analog conversion is conceived.

Next, each operation in the electromagnetic flowmeter 100 will be described. First, a flow rate measurement operation of measuring the flow rate of the liquid that flows inside the measurement pipe 1P in the electromagnetic flowmeter 100 will be described. In the flow rate measurement operation, the electromagnetic flowmeter 100 detects an electromotive force (a voltage) generated by the liquid flowing inside the magnetic field formed by the excitation coil 1C in each of the detection electrode 1A and the detection electrode 1B in a state in which each of the attachment diagnosis circuit 10 and the conductivity measurement circuit 20 does not output an AC signal (does not pass a rectangular current). Then, the differential amplification circuit 3 outputs a difference flow rate signal obtained by taking a difference between the flow rate signals (the flow rate signal VA and the flow rate signal VB) output by each of the detection electrode 1A and the detection electrode 1B and removing noise of an in-phase component. The flow rate signal A/D conversion circuit 4 outputs a difference digital flow rate signal obtained by performing analog-to-digital conversion on the difference flow rate signal (analog signal). Thereafter, the control calculator 6 calculates the flow rate on the basis of the difference digital flow rate signal output by the flow rate signal A/D conversion circuit 4 and outputs the flow rate as a measurement signal to the outside of the electromagnetic flowmeter 100. Also, the normal flow rate measurement operation in the electromagnetic flowmeter 100 is similar to a measurement operation of measuring a flow rate of a liquid in a general electromagnetic flowmeter. Therefore, the detailed description regarding the normal flow rate measurement operation of the electromagnetic flowmeter 100 will be omitted.

Next, the attachment diagnosis operation of diagnosing the attachment of a conductive substance to the detection electrode in the electromagnetic flowmeter 100 and the conductivity measurement operation of measuring the conductivity of a liquid that flows inside the measurement pipe 1P will be described. The attachment diagnosis circuit 10 outputs an AC signal in the attachment diagnosis operation in the electromagnetic flowmeter 100 and the conductivity measurement circuit 20 outputs an AC signal and supplies each rectangular current between the corresponding detection electrode 1A or 1B and the earth ring 1E in the conductivity measurement operation in the electromagnetic flowmeter 100. Thereby, each of the detection electrode 1A and the detection electrode 1B detects the electromotive force (the voltage value) generated due to the fluid resistance of the liquid that flows between each detection electrode and the earth ring 1E and outputs a flow rate signal (the flow rate signal VA or the flow rate signal VB) of a magnitude (a voltage value) of the detected electromotive force. Also in the attachment diagnosis operation and the conductivity measurement operation in the electromagnetic flowmeter 100, as in the normal flow rate measurement operation in the electromagnetic flowmeter 100, the differential amplification circuit 3 outputs a difference flow rate signal obtained by taking a difference between the flow rate signals (the flow rate signal VA and the flow rate signal VB) output by the detection electrode 1A and the detection electrode 1B and removing noise of an in-phase component and the flow rate signal A/D conversion circuit 4 outputs a difference digital flow rate signal obtained by performing analog-to-digital conversion on the difference flow rate signal (analog signal). Thereafter, the control calculator 6 performs the electrode attachment calculation process and the conductivity calculation process on the difference digital flow rate signal output by the flow rate signal A/D conversion circuit 4. Then, the control calculator 6 outputs a result of diagnosing the attachment of the conductive substance to the detection electrode by performing the electrode attachment calculation process or the conductivity of the liquid that flows inside the measurement pipe 1P calculated by performing the conductivity calculation process as a measurement signal to the outside of the electromagnetic flowmeter 100.

Also, in the electrode attachment calculation process and the conductivity calculation process in the electromagnetic flowmeter 100, the impedance between each detection electrode and the earth ring 1E is schematically represented (modeled) by an equivalent circuit in which a resistor and a capacitor are combined and each calculation process is performed on the basis of the equivalent circuit. Here, the equivalent circuit used in the electrode attachment calculation process and the conductivity calculation process in the electromagnetic flowmeter 100 will be described.

Figure 2:
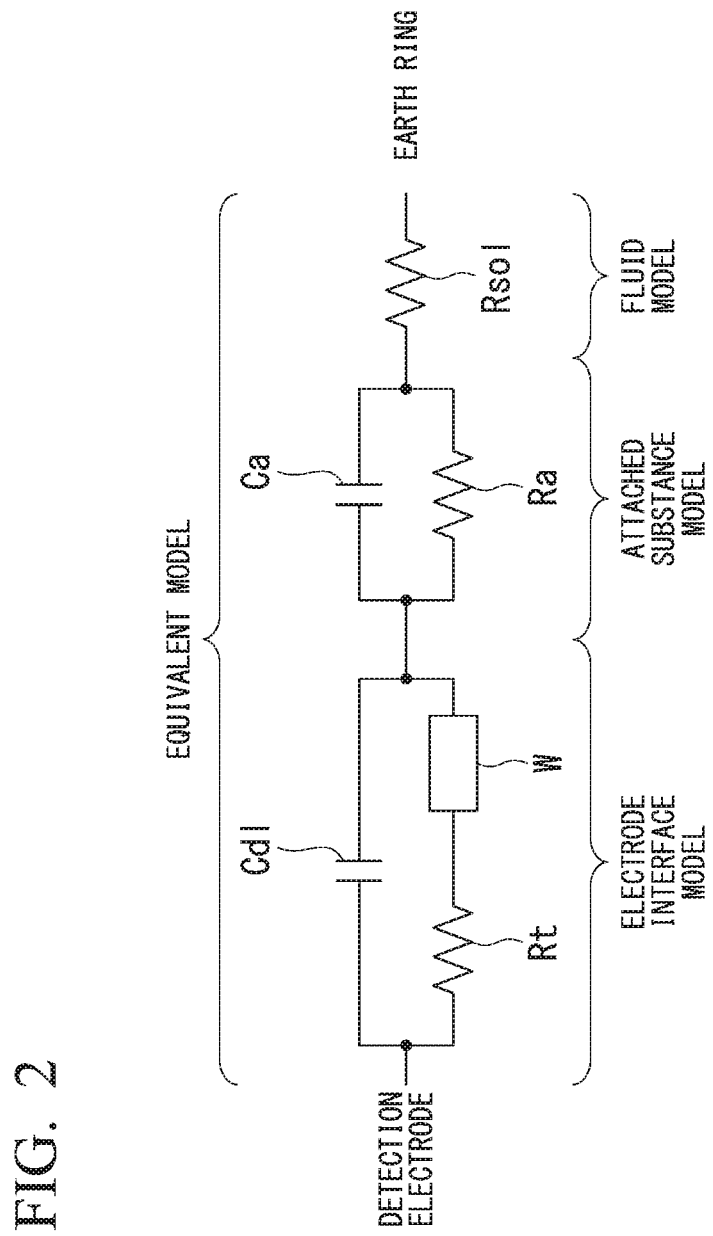
FIG. 2 shows an equivalent circuit used in the electromagnetic flowmeter according to the embodiment of the present invention.

FIG. 2 is a drawing showing an equivalent circuit used in the electromagnetic flowmeter 100 according to the embodiment of the present invention. FIG. 2 is an equivalent circuit (hereinafter referred to as an "equivalent model") obtained by schematically representing (modeling) the impedance between the detection electrode 1A or the detection electrode 1B and the earth ring 1E. FIG. 3A is a drawing showing an equivalent circuit in the field of electrochemistry to be referred to in the electromagnetic flowmeter 100 of the embodiment of the present invention. FIG. 3B is a drawing showing states of substances attached to the electrodes (the detection electrode 1A and the detection electrode 1B). Also, in the following description, an example in which the equivalent model shown in FIG. 2 is an equivalent circuit obtained by representing the impedance between the detection electrode 1A and the earth ring 1E will be described.

The equivalent model shown in FIG. 2 is an equivalent circuit of a configuration in which an electrode interface model, an attached substance model, and a fluid model are connected in series. Here, the electrode interface model is an equivalent circuit obtained by schematically representing (modeling) the impedance of the interface of the detection electrode 1A. Also, the attached substance model is an equivalent circuit obtained by schematically representing (modeling) the impedance of the conductive substance attached to the detection electrode 1A. Also, the fluid model is an equivalent circuit obtained by schematically representing (modeling) the impedance of the conductive liquid that flows inside the measurement pipe 1P.

In the electrode interface model, a charge transfer process resistor Rt and Warburg diffusion impedance W are connected in series and an electric double layer capacitor Cdl is further connected in parallel. The configuration of the electrode interface model is based on an equivalent circuit in the field of electrochemistry (hereinafter referred to as an "electrochemical model") as shown in FIG. 3A. More specifically, the configuration of the electrode interface model is a configuration in which a surface chemical reaction capacitor Cad within the electric double layer through which a diffusion current I flows and a reaction intermediate chemical reaction resistor Rsur are excluded from an equivalent circuit within the liquid in front of a passive film resistor Rpsv within a passive film of an electrode in the electrochemical model shown in FIG. 3A. Also, in the electrode interface model, the surface chemical reaction capacitor Cad and the reaction intermediate chemical reaction resistor Rsur are excluded from the electrochemical model because no chemical reaction occurs within the measurement pipe 1P in the electromagnetic flowmeter 100.

Also, in the attached substance model, an attached resistor Ra and an attached capacitor Ca are connected in parallel. The configuration of the attached substance model represents the state of a porous-shaped substance (an attached substance) attached to the electrodes (the detection electrode 1A and the detection electrode 1B) as shown in FIG. 3B. More specifically, in the configuration of the attached substance model, a portion corresponding to the liquid included in the porous-shaped attached substance shown in FIG. 3B is represented by the attached resistor Ra and a portion corresponding to an attached substance included in the porous-shaped attached substance is represented by the attached capacitor Ca.

Also, the fluid model includes a fluid resistor Rsol. The configuration of the fluid model is a configuration in front of the electric double layer in the equivalent circuit within the liquid in the electrochemical model shown in FIG. 3A.

Then, in the electromagnetic flowmeter 100, the control calculator 6 performs an electrode attachment calculation process of diagnosing the attachment of a conductive substance to the detection electrode and a conductivity calculation process of calculating the conductivity of a liquid that flows inside the measurement pipe 1P using an equivalent model in which the electrode interface model, the attached substance model, and the fluid model are connected in series as shown in FIG. 2. More specifically, in the electrode attachment calculation process, the control calculator 6 obtains values (parameters) of circuit elements (the charge transfer process resistor Rt, the Warburg diffusion impedance W, the electric double layer capacitor Cdl, the attached resistor Ra, and the attached capacitor Ca) in the electrode interface model and the attached substance model included in the equivalent model, for example, according to inverse calculation of a least square method, from a difference digital flow rate signal of each frequency output from the flow rate signal A/D conversion circuit 4. Then, the control calculator 6 diagnoses the presence or absence of the conductive substance attached to the detection electrode on the basis of frequency characteristics of each circuit element. At this time, the control calculator 6 generates a Cole-Cole plot diagram in which parameters of each circuit element are represented (plotted) according to a Cole-Cole arc rule in order to obtain frequency characteristics of each circuit element. Then, the control calculator 6 diagnoses the presence or absence of the conductive substance attached to the detection electrode on the basis of the arc represented in the generated Cole-Cole plot diagram.

Also, in the conductivity calculation process, as in the electrode attachment calculation process, the control calculator 6 obtains a value (a parameter) of the fluid resistor Rsol included in the equivalent model from the difference digital flow rate signal output from the flow rate signal A/D conversion circuit 4. Then, the control calculator 6 calculates the conductivity of the liquid that flows inside the measurement pipe 1P from the obtained value of the fluid resistor Rsol.

Also, the equivalent model of the configuration in which models (equivalent circuits) including the above-described electrode interface model, attached substance model, and fluid model are connected in series used in calculation processes including the electrode attachment calculation process and the conductivity calculation process by the control calculator 6 in the electromagnetic flowmeter 100 also includes an equivalent circuit schematically represented (modeled) to ascertain corrosion in a conventional electromagnetic flowmeter, i.e., an equivalent circuit corresponding to an insulating substance (an insulator). Therefore, the control calculator 6 not only can diagnose the attachment of the conductive substance to the detection electrode in the electrode attachment calculation process, but also can perform the diagnosis of the attachment of the insulator to the detection electrode from the difference digital flow rate signal of each frequency output from the flow rate signal A/D conversion circuit 4. In this case, the control calculator 6 obtains values (parameters) of the attached resistor Ra and the attached capacitor Ca included in the equivalent model from the difference digital flow rate signal output from the flow rate signal A/D conversion circuit 4. Then, the control calculator 6 generates a Cole-Cole plot diagram in which obtained parameters of the attached resistor Ra and attached capacitor Ca are represented (plotted) and diagnoses the presence or absence of an insulator attached to the detection electrode on the basis of an arc represented in the generated Cole-Cole plot diagram.

Here, an example of impedances measured by the electromagnetic flowmeter 100 in the attachment diagnosis operation and the conductivity measurement operation will be described. Also, as described above, when the attachment diagnosis operation is performed in the electromagnetic flowmeter 100, the control calculator 6 generates the attachment diagnosis timing signal TadX of a frequency swept, for example, between 10 Hz and 2 MHz, to output the attachment diagnosis timing signal TadX to the attachment diagnosis circuit 10. The attachment diagnosis circuit 10 supplies the rectangular current IadA between the detection electrode 1A and the earth ring 1E and supplies the rectangular current IadB between the detection electrode 1B and the earth ring 1E. Also, when the conductivity measurement operation is performed in in the electromagnetic flowmeter 100, the control calculator 6 generates the conductivity measurement timing signal TcmX having, for example, a frequency of 1 kHz or more, to output the conductivity measurement timing signal TcmX to the conductivity measurement circuit 20. The conductivity measurement circuit 20 supplies the rectangular current IcmA between the detection electrode 1A and the earth ring 1E and supplies the rectangular current IcmB between the detection electrode 1B and the earth ring 1E. That is, in the electromagnetic flowmeter 100, the control calculator 6 switches a timing signal to be output to each of the attachment diagnosis circuit 10 and the conductivity measurement circuit 20 so that the attachment diagnosis circuit 10 is operated during a period in which the attachment diagnosis operation is performed and the conductivity measurement circuit 20 is operated during a period in which the conductivity measurement operation is performed. However, in the following description, for ease of description, an example in which either the attachment diagnosis circuit 10 or the conductivity measurement circuit 20 supplies two rectangular currents in the attachment diagnosis operation and the conductivity measurement operation between the detection electrode 1A and the earth ring 1E and between the detection electrode 1B and the earth ring 1E will be described. That is, in the following description, an example in which the control calculator 6 outputs the conductivity measurement timing signal TcmX for performing the conductivity measurement operation following the attachment diagnosis timing signal TadX for performing the attachment diagnosis operation to either the attachment diagnosis circuit 10 or the conductivity measurement circuit 20 will be described.

Figure 4:
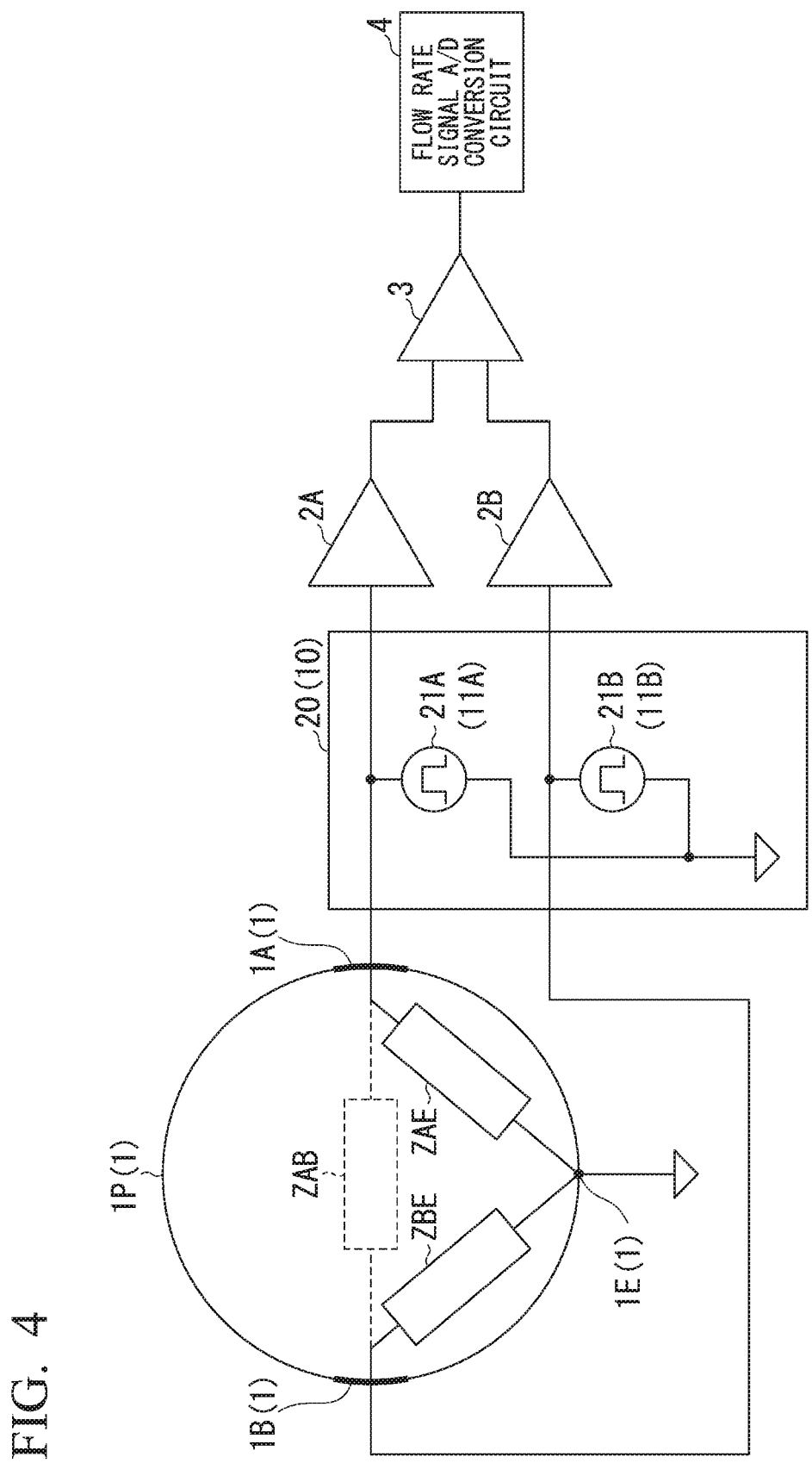
FIG. 4 is a block diagram simply showing a configuration operating in the electromagnetic flowmeter according to the embodiment of the present invention.

Also, in this case, the configuration of the electromagnetic flowmeter 100 becomes a configuration as shown in FIG. 4. FIG. 4 is a block diagram simply showing the configuration operating in the electromagnetic flowmeter 100 according to the embodiment of the present invention. In FIG. 4, the conductivity measurement circuit 20 is configured to pass two rectangular currents in the attachment diagnosis operation and the conductivity measurement operation and the components related to the attachment diagnosis operation and the conductivity measurement operation are shown together. Also, in FIG. 4, impedance ZAE between the detection electrode 1A and the earth ring 1E and impedance ZBE between the detection electrode 1B and the earth ring 1E schematically represented (modeled) in the equivalent model shown in FIG. 2 are shown within the measurement pipe 1P. Also, impedance ZAB between the detection electrode 1A and the detection electrode 1B which can be obtained on the basis of the impedance ZAE and the impedance ZBE measured in the attachment diagnosis operation and the conductivity measurement operation is also shown within the measurement pipe 1P in FIG. 4. Also, similar to the impedance ZAE and the impedance ZBE, the impedance ZAB can also be schematically represented (modeled) in the equivalent model shown in FIG. 2.

Figure 5A:
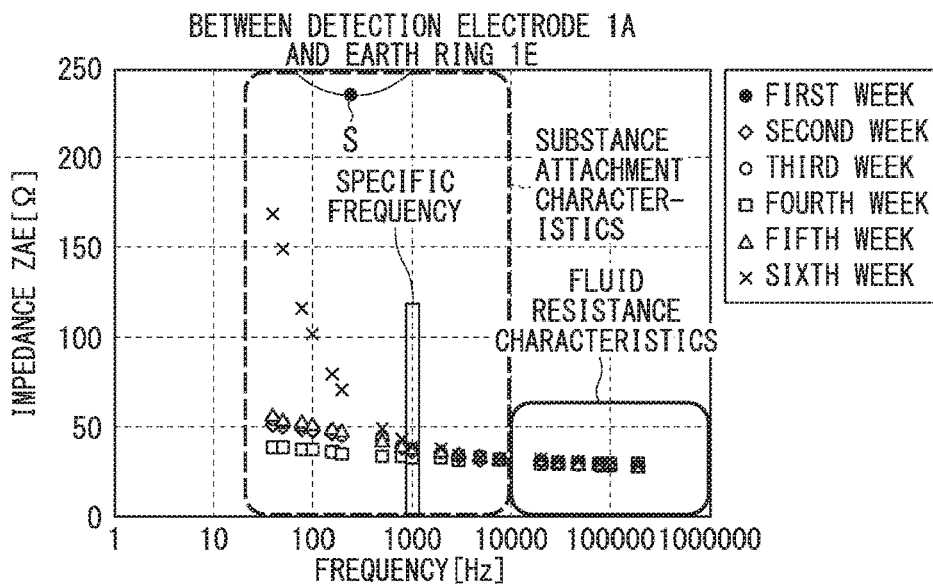
FIG. 5A is an explanatory diagram showing examples of impedances measured in the electromagnetic flowmeter according to the embodiment of the present invention.
Figure 5B:
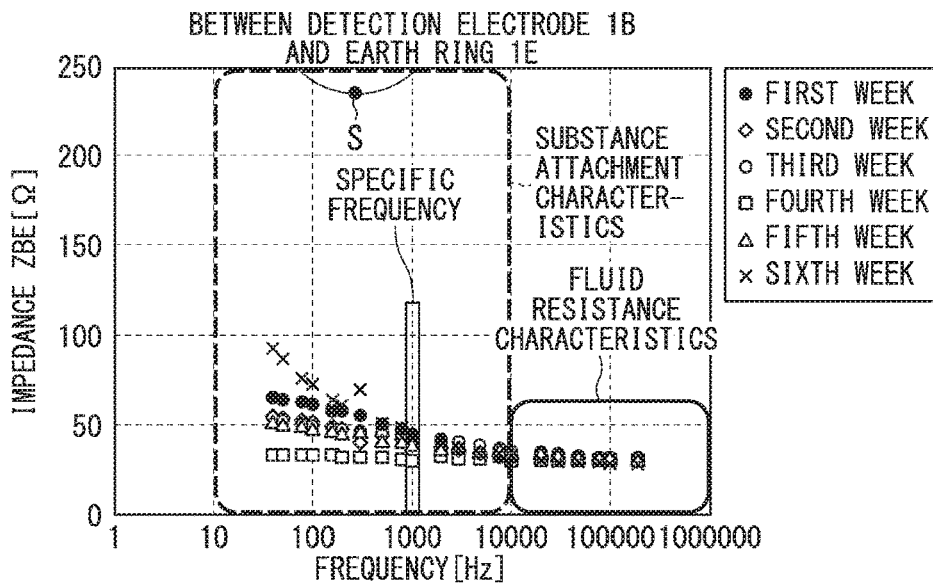
FIG. 5B is an explanatory diagram showing examples of impedances measured in the electromagnetic flowmeter according to the embodiment of the present invention.
Figure 5C:
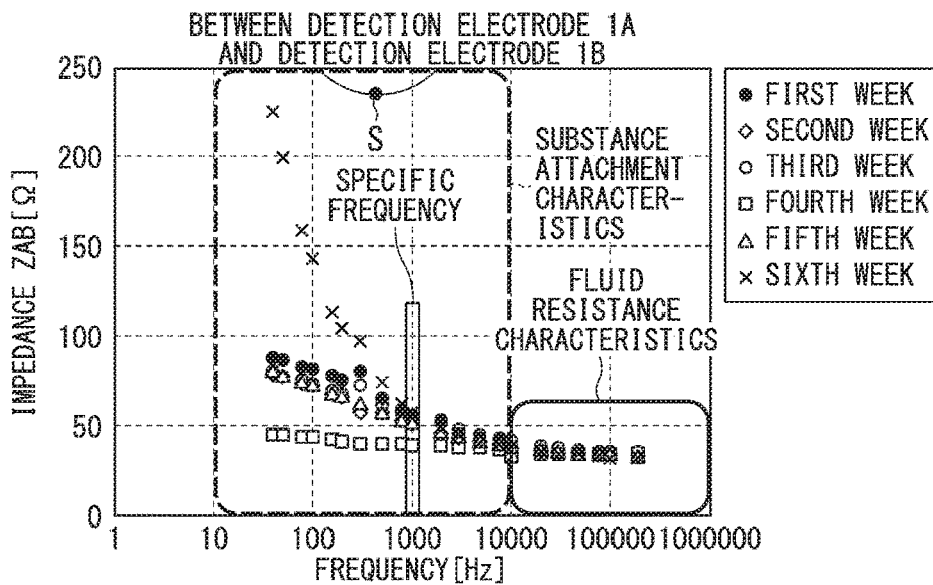
FIG. 5C is an explanatory diagram showing examples of impedances measured in the electromagnetic flowmeter according to the embodiment of the present invention.

FIGS. 5A to 5C are an explanatory drawing showing examples of impedances (impedance ZAE, impedance ZBE, and impedance ZAB) measured in the electromagnetic flowmeter 100 according to the embodiment of the present invention. FIG. 5A to 5C show examples of impedances for 6 weeks for which the electromagnetic flowmeter 100 performed an attachment diagnosis operation and a conductivity measurement operation at a rate of once a week. In FIG. 5A to 5C, impedance values measured by the conductivity measurement circuit 20 when a rectangular current of a frequency swept between 40 Hz and 200 kHz flows between the detection electrode 1A and the earth ring 1E and between the detection electrode 1B and the earth ring 1E in accordance with the timing signal output from the control calculator 6 are shown for each frequency of the rectangular current. In FIG. 5A, a value of the impedance ZAE between the detection electrode 1A and the earth ring 1E is shown for each frequency of the rectangular current. Also, in FIG. 5B, a value of the impedance ZBE between the detection electrode 1B and the earth ring 1E is shown for each frequency of the rectangular current. Also, in FIG. 5C, a value of the impedance ZAB between the detection electrode 1A and the detection electrode 1B capable of being obtained on the basis of the impedance ZAE and the impedance ZBE is shown for each frequency of the rectangular current.

Also, in the graph of FIG. 5A, the value of the impedance ZAE in a frequency range of 40 Hz to 10 kHz (a substance attachment characteristic range) is an impedance value obtained from the flow rate signal VA detected by the detection electrode 1A when the attachment diagnosis circuit 10 has supplied the rectangular current IadA between the detection electrode 1A and the earth ring 1E in accordance with the attachment diagnosis timing signal TadX output from the control calculator 6. Also, in the graph of FIG. 5A, the value of the impedance ZAE in a frequency range of 10 kHz to 200 kHz (a fluid resistance characteristic range) is an impedance value obtained from the flow rate signal VA detected by the detection electrode 1A when the conductivity measurement circuit 20 has supplied the rectangular current IcmA between the detection electrode 1A and the earth ring 1E in accordance with the conductivity measurement timing signal TcmX output from the control calculator 6. Also, in the graph of FIG. 5B, the value of the impedance ZBE in the substance attachment characteristic range is an impedance value obtained from the flow rate signal VB detected by the detection electrode 1B when the attachment diagnosis circuit 10 has supplied the rectangular current IadB between the detection electrode 1B and the earth ring 1E in accordance with the attachment diagnosis timing signal TadX output from the control calculator 6. Also, in the graph of FIG. 5B, the value of the impedance ZBE in the fluid resistance characteristic range is an impedance value obtained from the flow rate signal VB detected by the detection electrode 1B when the conductivity measurement circuit 20 has supplied the rectangular current IcmB between the detection electrode 1B and the earth ring 1E in accordance with the conductivity measurement timing signal TcmX output from the control calculator 6. Also, in the graph of FIG. 5C, the value of the impedance ZAB in each characteristic range is an impedance value between the detection electrode 1A and the detection electrode 1B capable of being obtained on the basis of an impedance value of the same characteristic range (frequency range) in the impedance ZAE shown in FIG. 5A and the impedance ZBE shown in FIG. 5B.

First, the impedance of a substance attachment characteristic range (a frequency range of 40 Hz to 10 kHz), i.e., an attachment diagnosis operation of diagnosing the attachment of the conductive substance to the detection electrode, will be described. As shown in the graphs of FIG. 5A to FIG. 5C, impedance values of frequencies from the first week to the fifth week are relatively stable values in the graphs. On the other hand, the impedance value in the sixth week is greater than those in the other weeks when the frequency is low. In the graphs of FIG. 5A and FIG. 5C among the graphs of FIG. 5A to FIG. 5C, the impedance value in the sixth week is particularly high. In this case, the control calculator 6 diagnoses that a conductive substance is attached to at least the detection electrode 1A in the electrode attachment calculation process. Then, the control calculator 6 outputs a measurement signal (a digital signal) representing a result of diagnosing the attachment of the conductive substance to the detection electrode to the outside of the electromagnetic flowmeter 100.

Also, in the electrode attachment calculation process, for example, the control calculator 6 may be configured to diagnose a state in which the conductive substance attached to the detection electrode is stacked (a thickness of the conductive substance) or the like from a history of a change in the impedance value of a predetermined specific frequency (a frequency of 1 kHz in FIG. 5A to FIG. 5C) and output a measurement signal (a digital signal) representing a diagnosis result to the outside of the electromagnetic flowmeter 100. Thereby, in the electromagnetic flowmeter 100, it is possible to determine a state in which the measurement pipe 1P is clogged (a degree of blockage).

Also, in the graphs of FIG. 5A to FIG. 5C, there is a value S of a singular point in the impedance value of the first week. For example, a case in which there is no attachment to either one of the detection electrodes at present, but a state in which the conductive substance previously attached to either one of the detection electrodes is separated from the detection electrode and suspended is detected can be conceived. In this case, the control calculator 6 diagnoses the attachment of the conductive substance to the detection electrode without including the value S of the singular point (by ignoring the value S of the singular point) in the electrode attachment calculation process.

Next, the impedance of a fluid resistance characteristic range (a frequency range of 10 kHz to 200 kHz), i.e., the conductivity measurement operation of measuring the conductivity of a liquid, will be described. As shown in the graphs of FIG. 5A to FIG. 5C, the impedance values of the frequencies from the first week to the sixth week are relatively stable values in the graphs. This is because the conductivity measurement circuit 20 in the conductivity measurement operation can obtain the impedance without being affected by the conductive substance attached to the detection electrode because the frequency of each of the rectangular current IcmA that flows between the detection electrode 1A and the earth ring 1E and the rectangular current IadB that flows between the detection electrode 1B and the earth ring 1E is high. The control calculator 6 calculates the conductivity of the liquid from the value of the measured impedance (the resistance value of the fluid resistor) in the conductivity calculation process and outputs a measurement signal (a digital signal) representing the calculated conductivity of the liquid to the outside of the electromagnetic flowmeter 100.

As described above, according to the mode for carrying out the present invention, a circuit for outputting an AC signal (an AC and a rectangular current) of a predetermined current value between each detection electrode for detecting an electromotive force (a voltage) generated due to a fluid that flows inside the measurement pipe and the earth ring (the earth electrode) is provided within the electromagnetic flowmeter. More specifically, in the mode for carrying out the present invention, an attachment diagnosis circuit for supplying a rectangular current of a frequency for diagnosing the attachment of a conductive substance to the detection electrode and a conductivity measurement circuit for supplying a rectangular current of a frequency for measuring the conductivity of a liquid that flows inside the measurement pipe are provided. Then, in the mode for carrying out the present invention, the attachment diagnosis circuit sweeps the frequency of the rectangular current that flows between the detection electrode and the earth ring within a predetermined frequency range and the conductivity measurement circuit increases the frequency of the rectangular current that flows between the detection electrode and the earth ring. In the mode for carrying out the present invention, also in the attachment diagnosis operation of diagnosing the attachment of the conductive substance to the detection electrode and the conductivity measurement operation of measuring the conductivity of the liquid, as in the normal flow rate measurement operation of measuring the flow rate of the fluid, the differential amplification circuit performs diagnosis or measurement on the basis of a flow rate signal after noise of an in-phase component is removed by taking a difference of flow rate signals output by the detection electrodes. At this time, in the mode for carrying out the present invention, the impedance between each detection electrode and the earth ring is diagnosed or measured on the basis of an equivalent circuit schematically represented (modeled) by an equivalent circuit in which a resistor and a capacitor are combined. More specifically, in the mode for carrying out the present invention, the attachment of the conductive substance to the detection electrode is diagnosed and the conductivity of the liquid is measured using an equivalent model in which equivalent circuits of the electrode interface model obtained by schematically representing (modeling) the interface of the detection electrode, the attached substance model obtained by schematically representing (modeling) the conductive substance attached to the detection electrode, and the fluid model obtained by schematically representing (modeling) the conductive liquid that flows inside the measurement pipe are connected in series.

Thereby, in the electromagnetic flowmeter of the mode for carrying out the present invention, it is possible to diagnose the attachment of the conductive substance to a detection electrode. Moreover, in the electromagnetic flowmeter of the mode for carrying out the present invention, because the equivalent model used for diagnosing the attachment of the conductive substance to the detection electrode also includes an equivalent circuit corresponding to an insulating substance (an insulator), it is possible to diagnose the attachment of the insulator to the detection electrode as in the conventional electromagnetic flowmeter. Furthermore, in the electromagnetic flowmeter of the mode for carrying out the present invention, it is possible to stably measure the conductivity of the liquid that flows inside the measurement pipe without being affected by the substance attached to the detection electrode because the conductivity measurement circuit increases the frequency of the rectangular current that flows between the detection electrode and the earth ring. That is, in the electromagnetic flowmeter of the mode for carrying out the present invention, it is possible to stably measure the conductivity of the liquid that flows inside the measurement pipe also in the state in which the conductive substance is attached to the detection electrode. Moreover, in the electromagnetic flowmeter of the mode for carrying out the present invention, because the frequency of the rectangular current supplied between the detection electrode and the earth ring by the attachment diagnosis circuit and the frequency of the rectangular current supplied between the detection electrode and the earth ring by the conductivity measurement circuit do not depend upon each other and it is not necessary to achieve synchronization with a reference clock signal (a system clock signal) in the electromagnetic flowmeter, the range of the conductivity of the liquid to be measured is not limited and measurement can be performed also at a high conductivity of, for example, 1 mS/cm or more or the like.

Also, in the electromagnetic flowmeter of the mode for carrying out the present invention, a configuration in which each of an attachment diagnosis circuit for supplying a rectangular current of a frequency for diagnosing the attachment of a conductive substance to the detection electrode and a conductivity measurement circuit for supplying a rectangular current of a frequency for measuring the conductivity of a liquid that flows inside the measurement pipe is provided has been described. That is, in the embodiment, a configuration in which the electromagnetic flowmeter 100 is configured to include the attachment diagnosis circuit 10 and the conductivity measurement circuit 20 has been described. However, as described above, in the electromagnetic flowmeter of the mode for carrying out the embodiment of the present invention, the configuration is not limited to that described in the embodiment as long as it is possible to pass a rectangular current of a frequency for diagnosing the attachment of a conductive substance to the detection electrode and a rectangular current of a frequency for measuring the conductivity of a liquid that flows inside the measurement pipe. That is, as in the configuration shown in FIG. 4 in the embodiment, the electromagnetic flowmeter may have a configuration in which a single measurement circuit in which a function of diagnosing the attachment of the conductive substance to the detection electrode in the attachment diagnosis circuit and a function of measuring the conductivity of the liquid in the conductivity measurement circuit are combined supplies both the rectangular current for diagnosing the attachment of the conductive substance to the detection electrode and the rectangular current for measuring the conductivity of the liquid. In this case, it is only necessary for a constant current source provided in the single measurement circuit in which the functions are combined to be a variable current source capable of changing a signal level (a current value) of each of the rectangular current for diagnosing the attachment of the conductive substance to the detection electrode and the rectangular current for measuring the conductivity of the liquid according to control from the control calculator.

Also, in the embodiment, a configuration in which the control calculator 6 provided in the electromagnetic flowmeter 100 generates and outputs timing signals (the excitation current timing signal TEX, the attachment diagnosis timing signal TadX, and the conductivity measurement timing signal TcmX) of frequencies required for operations of the excitation circuit 5, the attachment diagnosis circuit 10, and the conductivity measurement circuit 20 has been described. However, the configuration in which each timing signal is generated in the electromagnetic flowmeter 100 is not limited to the configuration shown in FIG. 1. For example, a counter circuit or a timer circuit provided in the electromagnetic flowmeter 100 may be configured to generate each timing signal. In this case, it is only necessary to configure the control calculator 6 that performs switching between the attachment diagnosis operation and the conductivity measurement operation in the electromagnetic flowmeter 100. Also, for example, components provided in the excitation circuit 5, the attachment diagnosis circuit 10, and the conductivity measurement circuit 20 may be configured to generate and output an excitation current or a rectangular current having the same frequency as a corresponding timing signal output by the control calculator 6. In this case, it is only necessary to configure the control calculator 6 that controls the output and stopping of the excitation current or the rectangular current when the flow rate measurement operation, the attachment diagnosis operation, or the conductivity measurement operation is performed in the electromagnetic flowmeter 100.

Also, in the embodiment, a configuration in which the control calculator 6 provided in the electromagnetic flowmeter 100 outputs a result of diagnosing the attachment of the conductive substance to the detection electrode by performing the electrode attachment calculation process or a measurement signal (a digital signal) representing the conductivity of the liquid that flows inside the measurement pipe 1P calculated by performing the conductivity calculation process to the outside of the electromagnetic flowmeter 100 has been described. However, for example, when a display is configured to be provided in the electromagnetic flowmeter 100, the display may be configured to display the result of diagnosing the attachment of the conductive substance to the detection electrode or information of the conductivity of the liquid that flows inside the measurement pipe 1P.

Also, in the embodiment, a timing at which the attachment diagnosis operation is started in the electromagnetic flowmeter 100 and a timing at which the conductivity measurement operation is started, i.e., triggers for performing the attachment diagnosis operation and the conductivity measurement operation in the electromagnetic flowmeter 100, are not particularly specified. Thus, the timings at which the attachment diagnosis operation and the conductivity measurement operation are started in the electromagnetic flowmeter 100 may be provided for each predetermined cycle. For example, the timings may be indicated by a worker who performs inspection work in a plant according to a manual operation.

Also, in the embodiment, the electromagnetic flowmeter 100 is shown as a configuration of an electromagnetic flowmeter including the two detection electrodes of the detection electrode 1A and the detection electrode 1B. However, the number of detection electrodes provided in the electromagnetic flowmeter 100 is not limited to the number shown in FIG. 1, and for example, an electromagnetic flowmeter having more detection electrodes than the electromagnetic flowmeter 100 shown in FIG. 1 such as an electromagnetic flowmeter having four or more detection electrodes may be configured. Also in the configuration of the electromagnetic flowmeter including more detection electrodes than the electromagnetic flowmeter 100 shown in FIG. 1, a concept for diagnosing the attachment of a conductive substance to the detection electrode in the electromagnetic flowmeter 100 or a concept for measuring the conductivity of a liquid that flows inside the measurement pipe can be similarly applied.

Also, in the embodiment for carrying out the present invention, an example in which the electromagnetic flowmeter 100 is installed in the pipe disposed within the plant and measures a flow rate of a conductive liquid that is a measurement target fluid that flows inside the measurement pipe 1P in the normal flow rate measuring operation has been described. However, a place where the electromagnetic flowmeter 100 is used, i.e., a facility where the electromagnetic flowmeter 100 is installed is not limited to the plant, and the electromagnetic flowmeter 100 can be used in various facilities. For example, the electromagnetic flowmeter 100 can also be used to measure an amount of hot water in a hot spring area or the like. Also in this case, because hot-spring mineral deposits are conductive substances, a function of diagnosing the attachment of a conductive substance to the detection electrode in the electromagnetic flowmeter 100 shown in the embodiment or a function of measuring the conductivity of a liquid (hot-spring water) is conceived to be effective.

[Supplementary Note]

According to the present invention, the electromagnetic flowmeter can perform measurement even when the conductivity of the liquid is high (for example, when the conductivity is 1 mS/cm or more) without limiting a range in which the conductivity of the liquid is measured by controlling the frequency of the AC that flows through each detection electrode so that the frequency is 1 kHz or more when the conductivity is calculated.

Also, in the electromagnetic flowmeter according to the present invention, the measurement circuit may include a conductivity measurement circuit configured to supply a first alternating current between the detection electrodes and the earth electrode; and an attachment diagnosis circuit configured to supply a second alternating current between the detection electrodes and the earth electrode, wherein a current source of the first alternating current and a current source of the second alternating current may be the same current source or different current sources.

According to the present invention, the electromagnetic flowmeter can perform the calculation of the conductivity of the liquid and the diagnosis of the attachment of the substance to the detection electrode using the first AC and the second AC having different frequencies. The electromagnetic flowmeter according to the present invention can set the first AC passed to each of the detection electrodes by the current source provided in the conductivity measurement circuit and the second AC passed to each of the detection electrodes by the current source provided in the attachment diagnosis circuit to ACs having different current values. Thereby, the electromagnetic flowmeter according to the present invention can set a current value of the first AC that flows through each detection electrode when the conductivity is calculated and a current value of the second AC that flows through each detection electrode when the attachment of the substance to the detection electrode is diagnosed to appropriate current values, calculate the conductivity on the basis of the flow rate signal output in the state in which the first AC has flowed and diagnose the attachment of the substance to the detection electrode on the basis of the flow rate signal output in the state in which the second AC has flowed.

Also, in the electromagnetic flowmeter according to the present invention, the control calculator may control a frequency of the first alternating current and a frequency of the second alternating current to be frequencies which do not depend upon a reference clock signal for flow rate measurement in the electromagnetic flowmeter.

According to the present invention, the electromagnetic flowmeter can set a frequency of the first AC that flows through each detection electrode when the conductivity is calculated and a frequency of the second AC that flows through each detection electrode when the attachment of the substance to the detection electrode is diagnosed to appropriate frequencies. Thereby, the electromagnetic flowmeter according to the present invention can perform measurement even when the conductivity of the liquid is high (for example, the conductivity is 1 mS/cm or more) without limiting a range in which the conductivity of the liquid is measured.

Also, in the electromagnetic flowmeter according to the present invention, the control calculator may control a frequency of the first alternating current and a frequency of the second alternating current to be a plurality of frequencies between 10 Hz and 2 MHz in order to measure electrical characteristics of a substance attached to the detection electrodes and measure the conductivity of the liquid.

According to the present invention, the electromagnetic flowmeter controls frequencies of ACs that flow through the detection electrodes so that the frequencies become a plurality of frequencies between 10 Hz and 2 MHz when each of the measurement of the attachment of the substance to the detection electrode and the measurement of the conductivity of the liquid is performed. Thereby, the electromagnetic flowmeter according to the present invention can appropriately diagnose the attachment of the substance to the detection electrode and appropriately calculate the conductivity of the liquid without being affected by the substance attached to the detection electrode.

Also, in the electromagnetic flowmeter according to the present invention, the control calculator may calculate the conductivity and diagnose electrical characteristics of a substance attached to the detection electrodes using an equivalent model which schematically represents an impedance between the detection electrodes and the earth electrode.

According to the present invention, the electromagnetic flowmeter can diagnose the conductivity of the liquid and the electrical characteristics of the substance attached to the detection electrode using the accurately represented equivalent model including the substance attached to the detection electrode.

Also, in the electromagnetic flowmeter according to the present invention, the equivalent model may be an equivalent circuit in which an electrode interface model which schematically represents an impedance of an interface of the detection electrodes, an attached substance model which schematically represents an impedance of the substance, and a fluid model which schematically represents an impedance of the liquid are connected in series.

Also, in the electromagnetic flowmeter according to the present invention, the attached substance model may be an equivalent circuit which schematically represents an impedance of the substance with conductivity attached to the detection electrodes.

According to the present invention, the electromagnetic flowmeter can diagnose the conductivity of the liquid and the electrical measurement of the substance attached to the detection electrode using the equivalent model obtained by accurately representing the state of the interface of the detection electrode in the measurement pipe, the state of the conductive substance attached to the detection electrode, and the resistance of the fluid.

Also, in the electromagnetic flowmeter according to the present invention, the control calculator may obtain a fluid resistor constituting the fluid model from the flow rate signal, configured to calculate the conductivity from a value of the fluid resistor, may obtain a circuit element constituting the electrode interface model and a circuit element constituting the attached substance model from the flow rate signal, and may diagnose electrical characteristics of the substance attached to the detection electrodes based on frequency characteristics of each circuit element.

According to the present invention, the electromagnetic flowmeter can diagnose the conductivity of the liquid and the electrical characteristics of the substance attached to the detection electrode on the basis of the corresponding circuit element among the circuit elements represented by the equivalent model.

Also, in the electromagnetic flowmeter according to the present invention, in order to obtain the frequency characteristics of the each circuit element, the control calculator may represent a value of the each circuit element in a Cole-Cole plot diagram, and may diagnose electrical characteristics of the substance attached to the detection electrodes based on an arc represented in the Cole-Cole plot diagram.

According to the present invention, the electromagnetic flowmeter can diagnose the presence or absence of the substance attached to the detection electrode on the basis of the frequency characteristics of the corresponding circuit element. Furthermore, the electromagnetic flowmeter of the present invention can diagnose a state in which the substance attached to the detection electrode is stacked.

Also, in the electromagnetic flowmeter according to the present invention, the at least one pair of the detection electrodes may include a first detection electrode and a second detection electrode, the measurement circuit may include a first constant current source configured to supply a first rectangular current between the first detection electrode and the earth electrode; and a second constant current source configured to supply a second rectangular current between the second detection electrode and the earth electrode, and the first rectangular current and the second rectangular current may be alternating currents having opposite polarities at the same frequency.

Also, in the electromagnetic flowmeter according to the present invention, the earth electrode may be disposed at a position where a distance between the first detection electrode and the earth electrode is equal to a distance between the first detection electrode and the earth electrode.

Also, the electromagnetic flowmeter according to the present invention may further includes: a first buffer circuit configured to convert an impedance of a first flow rate signal output from the first detection electrode, and configured to output the first flow rate signal of which impedance has been converted; a second buffer circuit configured to convert an impedance of a second flow rate signal output from the second detection electrode, and configured to output the second flow rate signal of which impedance has been converted; and a differential amplification circuit configured to calculate a difference between the first flow rate signal output from the first buffer circuit and the second flow rate signal output from the second buffer circuit, and configured to amplify the calculated difference to generate a difference flow rate signal.

Also, the electromagnetic flowmeter according to the present invention may further include: a flow rate signal A/D conversion circuit configured to perform analog-to-digital conversion on the difference flow rate signal generated by the differential amplification circuit to generate a difference digital flow rate signal, wherein the control calculator may calculate the flow rate of the liquid flowing in the measurement pipe based on the difference digital flow rate signal generated by the flow rate signal A/D conversion circuit.

Also, the electromagnetic flowmeter according to the present invention may further include: an excitation coil; and an excitation circuit configured to output an excitation current of alternating current to the excitation coil, wherein the control calculator may generate an excitation current timing signal of a frequency required for forming the magnetic field for the measurement pipe, and may output the generated excitation current timing signal to the excitation circuit.

Also, in the electromagnetic flowmeter according to the present invention, the control calculator may generate an attachment diagnosis timing signal of a frequency swept within a predetermined frequency range required for performing an attachment diagnosis operation of diagnosing a substance attached to the detection electrodes, and may output the generated attachment diagnosis timing signal to the attachment diagnosis circuit.

Also, in the electromagnetic flowmeter according to the present invention, the control calculator may generate a conductivity measurement timing signal of a predetermined frequency required for performing a conductivity measurement operation of measuring the conductivity of the liquid, and may output the generated conductivity measurement timing signal to the conductivity measurement circuit.

Also, in the electromagnetic flowmeter according to the present invention, the control calculator may set a frequency of the conductivity measurement timing signal to be greater than or equal to a frequency of the attachment diagnosis timing signal.

Also, in the electromagnetic flowmeter according to the present invention, the electrode interface model may be a model in which a charge transfer process resistor and a Warburg diffusion impedance are connected in series and an electric double layer capacitor is further connected in parallel, the attached substance model may be a model in which an attached resistor and an attached capacitor are connected in parallel, and the fluid model may include a fluid resistor.

Also, in the electromagnetic flowmeter according to the present invention, the control calculator may be a processor which executes an application program to control all components provided in the electromagnetic flowmeter.

Also, a control method of an electromagnetic flowmeter for measuring a flow rate of a liquid of a measurement target that flows in a magnetic field formed within a measurement pipe, the control method may include: detecting, by at least one pair of detection electrodes, an electromotive force generated due to a flow of the liquid; outputting, by the at least one pair of the detection electrodes, a flow rate signal of a magnitude of the detected electromotive force; supplying, by a measurement circuit, an alternating current between the detection electrodes and an earth electrode; controlling, by a control calculator, a frequency of the alternating current to be 1 kHz or more; and calculating, by the control calculator, a conductivity of the liquid whose conductivity is 1 mS/cm or more based on the flow rate signal output when the alternating current flows between the detection electrodes and the earth electrode.

According to the present invention, the control method of the electromagnetic flowmeter can perform measurement even when the conductivity of the liquid is high (for example, when the conductivity is 1 mS/cm or more) without limiting a range in which the conductivity of the liquid is measured by controlling the frequency of the AC that flows through each detection electrode so that the frequency is 1 kHz or more when the conductivity is calculated.

As used herein, the following directional terms "front, back, above, downward, right, left, vertical, horizontal, below, transverse, row and column" as well as any other similar directional terms refer to those instructions of a device equipped with the present invention. Accordingly, these terms, as utilized to describe the present invention should be interpreted relative to a device equipped with the present invention.

The term "configured" is used to describe a component, unit or part of a device includes hardware and/or software that is constructed and/or programmed to carry out the desired function.

Moreover, terms that are expressed as "means-plus function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. An electromagnetic flowmeter for measuring a flow rate of a liquid of a measurement target that flows in a magnetic field formed within a measurement pipe, the electromagnetic flowmeter comprising:
   at least one pair of detection electrodes configured to detect an electromotive force generated due to a flow of the liquid, and configured to output a flow rate signal;
   a measurement circuit configured to supply an alternating current between the detection electrodes and an earth electrode;
   a control calculator configured to control a frequency of the alternating current to be 1 kHz or more, and configured to calculate a conductivity of the liquid based on the flow rate signal output when the alternating current whose frequency is 1 kHz or more flows between the detection electrodes and the earth electrode, the frequency of the alternating current being increased when the calculation of the conductivity is performed;
   a conductivity measurement circuit configured to supply a first alternating current between the detection electrodes and the earth electrode; and an attachment diagnosis circuit configured to supply a second alternating current between the detection electrodes and the earth electrode, wherein a current source of the first alternating current and a current source of the second alternating current are the same current source or different current sources, wherein the control calculator is configured to calculate the conductivity and diagnose electrical characteristics of a substance attached to the detection electrodes using an equivalent model which schematically represents an impedance between the detection electrodes and the earth electrode, wherein the equivalent model is an equivalent circuit in which an electrode interface model which schematically represents an impedance of an interface of the detection electrodes, an attached substance model which schematically represents an impedance of the substance, and a fluid model which schematically represents an impedance of the liquid are connected in series, wherein the attached substance model is an equivalent circuit which schematically represents an impedance of the substance attached to the detection electrodes, wherein the control calculator is configured to obtain a value of a fluid resistor constituting the fluid model from the flow rate signal, configured to calculate the conductivity from the value of the fluid resistor, configured to obtain a circuit element constituting the electrode interface model and a circuit element constituting the attached substance model from the flow rate signal, and configured to diagnose electrical characteristics of the substance attached to the detection electrodes based on frequency characteristics of each circuit element, and wherein in order to obtain the frequency characteristics of each of the circuit elements, the control calculator is configured to represent a value of each of the circuit elements in a Cole-Cole plot diagram, and configured to diagnose electrical characteristics of the substance attached to the detection electrodes based on an arc represented in the Cole-Cole plot diagram.

2. The electromagnetic flowmeter according to claim 1, wherein the control calculator is configured to control a frequency of the first alternating current and a frequency of the second alternating current to be frequencies which do not depend upon a reference clock signal for flow rate measurement in the electromagnetic flowmeter.

3. The electromagnetic flowmeter according to claim 1, wherein the control calculator is configured to control a frequency of the first alternating current and a frequency of the second alternating current to be a plurality of frequencies between 10 Hz and 2 MHz in order to measure electrical characteristics of a substance attached to the detection electrodes and measure the conductivity of the liquid.

4. The electromagnetic flowmeter according to claim 1, wherein the at least one pair of the detection electrodes comprises a first detection electrode and a second detection electrode, wherein the measurement circuit comprises:
a first constant current source configured to supply a first rectangular current between the first detection electrode and the earth electrode; and a second constant current source configured to supply a second rectangular current between the second detection electrode and the earth electrode, and wherein the first rectangular current and the second rectangular current are alternating currents having opposite polarities at the same frequency.

5. The electromagnetic flowmeter according to claim 4, wherein the earth electrode is disposed at a position where a distance between the first detection electrode and the earth electrode is equal to a distance between the second detection electrode and the earth electrode.

6. The electromagnetic flowmeter according to claim 4, further comprising:

a first buffer circuit configured to convert an impedance of a first flow rate signal output from the first detection electrode, and configured to output the first flow rate signal of which impedance has been converted;

a second buffer circuit configured to convert an impedance of a second flow rate signal output from the second detection electrode, and configured to output the second flow rate signal of which impedance has been converted; and a differential amplification circuit configured to calculate a difference between the first flow rate signal output from the first buffer circuit and the second flow rate signal output from the second buffer circuit, and configured to amplify the calculated difference to generate a difference flow rate signal.

7. The electromagnetic flowmeter according to claim 6, further comprising:

a flow rate signal A/D conversion circuit configured to perform analog-to-digital conversion on the difference flow rate signal generated by the differential amplification circuit to generate a difference digital flow rate signal, wherein the control calculator is configured to calculate the flow rate of the liquid flowing in the measurement pipe based on the difference digital flow rate signal generated by the flow rate signal A/D conversion circuit.

8. The electromagnetic flowmeter according to claim 1, further comprising:

an excitation coil; and
an excitation circuit configured to output an excitation current of alternating current to the excitation coil, wherein the control calculator is configured to generate an excitation current timing signal of a frequency required for forming the magnetic field for the measurement pipe, and configured to output the generated excitation current timing signal to the excitation circuit.

9. The electromagnetic flowmeter according to claim 1, wherein the control calculator is configured to generate an attachment diagnosis timing signal of a frequency swept within a predetermined frequency range required for performing an attachment diagnosis operation of diagnosing a substance attached to the detection electrodes, and configured to output the generated attachment diagnosis timing signal to the attachment diagnosis circuit.

10. The electromagnetic flowmeter according to claim 9, wherein the control calculator is configured to generate a conductivity measurement timing signal of a predetermined frequency required for performing a conductivity measurement operation of measuring the conductivity of the liquid, and configured to output the generated conductivity measurement timing signal to the conductivity measurement circuit.

11. The electromagnetic flowmeter according to claim 10, wherein the control calculator is configured to set a frequency of the conductivity measurement timing signal to be greater than or equal to a frequency of the attachment diagnosis timing signal.

12. The electromagnetic flowmeter according to claim 1, wherein the electrode interface model is a model in which a charge transfer process resistor and a Warburg diffusion impedance are connected in series and an electric double layer capacitor is further connected in parallel, wherein the attached substance model is a model in which an attached resistor and an attached capacitor are connected in parallel, and
wherein the fluid model comprises a fluid resistor.

13. The electromagnetic flowmeter according to claim 1, wherein the control calculator is a processor which executes an application program to control all components provided in the electromagnetic flowmeter.

14. A control method of an electromagnetic flowmeter for measuring a flow rate of a liquid of a measurement target that flows in a magnetic field formed within a measurement pipe, the control method comprising:
  detecting, by at least one pair of detection electrodes, an electromotive force generated due to a flow of the liquid;
  outputting, by the at least one pair of the detection electrodes, a flow rate signal;
  supplying, by a measurement circuit, an alternating current between the detection electrodes and an earth electrode;
  controlling, by a control calculator, a frequency of the alternating current to be 1 kHz or more;
  calculating, by the control calculator, a conductivity of the liquid based on the flow rate signal output when the alternating current whose frequency is 1 kHz or more flows between the detection electrodes and the earth electrode, the frequency of the alternating current being increased when the calculation of the conductivity is performed,
  supplying a first alternating current between the detection electrodes and the earth electrode; and
  supplying a second alternating current between the detection electrodes and the earth electrode,
wherein a current source of the first alternating current and a current source of the second alternating current are the same current source or different current sources,
wherein a current source of the first alternating current and a current source of the characteristics of a substance attached to the detection electrodes are performed using an equivalent model which schematically represents an impedance between the detection electrodes and the earth electrode,
wherein the equivalent model is an equivalent circuit in which an electrode interface model which schematically represents an impedance of an interface of the detection electrodes an attached substance model which schematically represents an impedance of the substance, and a fluid model which schematically represents an impedance of the liquid are connected in series,
wherein the attached substance model is an equivalent circuit which schematically represents an impedance of the substance attached to the detection electrodes
wherein a value of a fluid resistor constituting the fluid model from the flow rate signal is obtained, the conductivity is calculated from the value of the fluid resistor, a circuit element constituting the electrode interface model and a circuit element constituting the attached substance model are obtained from the flow rate signal, and electrical characteristics of the substance attached to the detection electrodes are diagnosed based on frequency characteristics of each circuit element, and
wherein in order to obtain the frequency characteristics of each of the circuit elements, a value of each of the circuit elements is represented in a Cole-Cole plot diagram, and electrical characteristics of the substance attached to the detection electrodes are diagnosed based on an arc represented in the Cole-Cole plot diagram.

* * * * *